Patented Mar. 1, 1927.

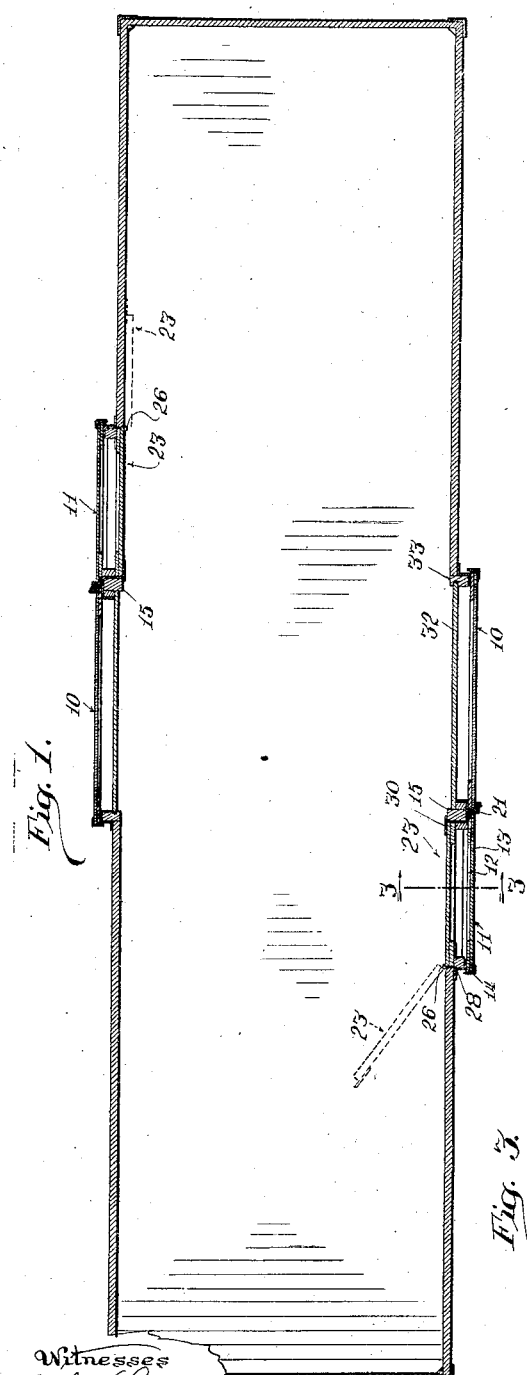

1,619,048

UNITED STATES PATENT OFFICE.

GORDON L. WHIPPLE, OF OMAHA, NEBRASKA, AND LEWIS K. SILLCOX, OF RIVERSIDE, ILLINOIS.

RAILROAD-CAR-DOOR CONSTRUCTION.

Application filed October 17, 1924. Serial No. 744,096.

Our invention relates to a permanent door construction for the standard automobile railroad car at present in use, whereby a continuous inner wall for the car is provided to adapt the car for the shipment of grain and other granular commodities, and leakage of the grain through the door openings prevented.

Our invention has for its object the provision of a construction adapted to the standard side door type of automobile car at present in use, whereby one of the doors on each side of the car is permanently secured in place in such manner as will permit the door to swing back, parallel with the inner side wall of the car when the car is used for the shipment of automobiles in order that the door opening may be enlarged beyond the usual side door opening; while at the same time presenting a construction which will provide a continuous inner wall as well as an abutting member for the main side door of the car; and also presenting a nailing strip or post for the usual grain boards or planks employed for sealing the large or main door opening as is the present practice in the shipment of grain in box or closed cars.

The objects and advantages of our invention will all be more readily comprehended from the following detailed description of the drawing, wherein:

Figure 1 is a sectional plan of the walls of a car with our improved grain door shown in closed position and at one side shown in dotted lines in open position.

Figure 2 is a longitudinal sectional view of the doors on one side of the car, with intermediate portions broken away.

Figure 3 is a detail sectional view taken substantially on the line 3—3 of Figure 1 looking in the direction of the arrows.

Our invention relates to closures for the double door openings of a railroad car and more particularly to a permanent door for a portion of the door opening in the side walls of the standard type of automobile railroad car. Railroad cars for the shipment of automobiles are provided with door openings in the side walls, at points intermediate of the ends of the car and at points substantially opposite each other; these door openings being of the standard size and usually closed by means of the slidably mounted doors shown at 10, 10. In order to adapt the car, however, for the loading and shipment of automobiles, it is necessary to provide enlarged door openings which will permit the automobiles to be run into the car from the loading platforms; and in order to enable this to be readily accomplished from the loading platforms on either side of the car, the side wall of the car is provided with what may be termed auxiliary door openings arranged at opposite sides of the main door openings, relative to the ends of the car; that is to say, the auxiliary opening on one side of the car is arranged intermediate of the main door opening and one end of the car while the auxiliary opening on the opposite side of the car is arranged intermediate of the main door opening and the opposite end of the car, so as to somewhat offset the openings as shown in Figure 1. The auxiliary doors 11, 11 are slidably arranged to come into abutting relation with the main doors 10, 10 when in closed position, as shown in Figure 1.

The auxiliary doors 11, 11 consist preferably of wooden frame members 12 to which the outer planks or boards 13 are secured; the one longitudinal side being provided with a reenforcing angle member as at 14; while the other side is provided with a door post 15, a nailing strip or timber 16 and a spacing block or timber 17. This side of the door is also preferably provided with a reenforcing iron or channel 18, one leg whereof is shown disposed between the post 15 and the spacing block or timber 17. The post 15, the nailing strip or timber 16, the spacing block or timber 17 and the reenforcing iron 18 are all shown bolted together at 19 and these various elements in turn are secured to the side of the auxiliary door 11 by means of bolts as at 20, the nuts whereof are preferably countersunk in the inner face of the post 15 as shown in Figure 2. This side of the auxiliary door is also preferably provided with a metallic reenforcing member and abutting strip 21, somewhat Z-shape in cross section, with one portion thereof secured between the channel iron 18 and the frame portion of the auxiliary door; the reenforcing iron 21 providing an abutment and retaining member for the adjacent side of the main door 10.

Both doors 10 and 11 are mounted to slide lengthwise of the car sides in the usual manner; the auxiliary door 11 carrying the posts 15, 16 and 17 with it so as to move the composite door posts 15, 16 and 17 into abutting relation with the permanent door post 22 when the door is opened and thereby providing an enlarged door opening to permit the loading of automobiles.

As cars of this type are frequently employed for the shipment of grain, it is necessary to provide means whereby the door openings will be more securely sealed against the egress of grain or granular lading, which otherwise would sift through the crevices at the door openings. In railroad practice, it has been usual, for the ordinary door openings, to employ standard lengths of grain boards, namely planks approximately seven feet in length which have been nailed to the permanent door posts. Where an automobile type of railroad car is used for the shipment of grain, it is apparent that means must also be provided for sealing the auxiliary door openings, which in practice are usually about four feet in size and therefore of a width less than the length of the standard sized timbers or planks at present in use.

One object of our invention is to provide means whereby the auxiliary door openings will be properly sealed by means which will be permanently secured to the car and thereby obviate the necessity for providing special sized planks and at the same time eliminating the difficulty encountered in the loss of the timbers or planks.

This feature of our invention is more clearly shown in Figure 2 and consists of an inner door shown at 23 comprising suitable frame members 24, the inner sides whereof are provided with suitable boards or planks 25. This inner door 23 is arranged to fit into the auxiliary door opening in the side wall of the car so as to be in lapping relation with the permanent door post 22 and the spacing block or timber 17 at the opposite end of the auxiliary door 11. The inner door 23, which may either slide or swing into position, is preferably secured in place at one side by means of any suitable hinge as at 26 so arranged as to permit the inner door 23 to be swung inwardly and into parallel relation with the inner side wall of the car in the manner disclosed in Figure 1. In the exemplification, the hinge 26 is shown with one of the leaves or straps 27 of the hinge arranged intermediate of the permanent post 22 and the Z-bar 28 whereby the door post is secured in place; the hinge-leaf or strap 27 being secured in any suitable manner, as for example by means of the bolt 29 whereby the timber portion 22 of the door post and the metallic portion or Z-bar 28 are secured together.

The free side of the inner door 23 is preferably provided, on its inner surface, with a metallic strip or plate 30 which is adapted to overlap the juncture of the inner door 23 with the composite movable door post in order to provide a grain seal.

The space between the inner door 23 and the outer auxiliary door 11, at the bottom of the doors, is provided with a grain strip or sealing plank 31 which is inserted between the permanent door post 22 and the spacing timber or block 17 of the movable door post and onto the ledge of the door opening in the side wall of the car so as to seal the crevice at the bottom of the door. This sealing strip 31 is put into place after the auxiliary door 11 has been moved to completely closed position, namely when the reenforcing angle iron 14 is in abutting relation with the metallic door post member 28, and before the inner door 23 has been closed. With this construction, it is evident that the car will be adapted for the hauling of grain or any granular lading and that the inner door 23 will be disposed flush with the side walls of the car, with the hinge side of the inner door in lapping relation with the permanent door post, thereby preventing any sifting of the grain at this point.

In railroad practice where box cars have been used for the shipment of grain, it has been usual to nail the standard sized boards or planks, indicated at 32, to the side door posts of the car. As a result of this practice, the door post, due to the constant removal of the grain boards and repeated nailing into place, becomes lacerated and soon requires renewal, thus entailing considerable time and expense. Another object of our invention is to obviate, as much as possible, the destruction of the permanent door post and also to eliminate the loss of time in the application and renewal of such planks or boards. For this reason, we provide the permanent door post 33 with a vertically disposed channel or groove 34 of size sufficient to receive one end of each plank or board 32; the planks or boards being arranged in superposed relation to the required height, with the other ends of each board or plank arranged in abutting relation with the movable door post member 15 and in lapping relation with the door post member or nailing strip 16. The nailing strip 16, with the adjacent side of the channel member 18, is of less width than the door post member 15 and permanent door post 33, so that the boards or planks 32 may extend substantially parallel with the car sides and at the same time be within the vertical plane of the outer surfaces of the car sides. The ends of the boards 32 may then be nailed to the strip 16 as shown at 35 in Figure 2. With this construction, it is apparent that less nailing is required and thus a considerable saving of time and labor also obtained in the placing and the removal of the grain door planks 32. Furthermore, with our improved construction, wherein the planks 32 are merely nailed at one end, the comparatively small nailing strip 16 can be more readily removed and replaced after it has become too greatly lacerated as a result of repeated nailing and removal of the nails; the renewal of the nailing strip being easily accomplished by simply removing the bolts 19.

As the construction of the outer doors and their mountings is of the usual type employed, a specific description of their construction and mountings need not be entered into; the invention having been shown as more especially intended for use in connection with a well known type of automobile railroad car and has been described in terms employed merely as terms of description and not as terms of limitation, as structural modifications are possible and may be made without, however, departing from the spirit of our invention.

What we claim is:

1. In a railroad car, the combination of a main door and an auxiliary door slidably mounted on the car exterior, a movable door-post carried by the auxiliary door, a spacing block secured to said movable door-post, with an inner door hingedly secured to one of the permanent door-posts of the car so as to swing inwardly into parallel relation with the car side wall, said inner door, when closed, being arranged in lapping relation with said permanent door-post and said spacing block.

2. In a railroad car door construction, a slidably mounted door provided with a door-post secured thereto, a spacing block secured to one side of said door-post, and a nailing block secured to the opposite side of said door-post, both of said blocks being removably secured to said door-post and all movable with the slidable door.

3. In a railroad car door construction, a main door and an auxiliary door, both of said doors being slidable into and out of abutting relation, a composite door-post secured to and movable with the auxiliary door, said door-post comprising a main post, a nailing block, and a reenforcing channel member disposed about the main post and the nailing block, the nailing block being removably secured in place, in combination with an inner door hingedly secured at one side of the auxiliary door opening and adapted to extend intermediate of the car side wall and the composite door post.

4. In a door construction of the character described, the combination of a main door and an auxiliary door, both slidably mounted on the car exterior to move into abutting relation, a permanent door-post disposed at one side of the main door opening and provided with a vertically arranged groove in the side thereof, a movable door-post carried by the auxiliary door, a nailing block secured to said movable door-post, superposed planks for the main door opening, one end of each of said planks being seatable in said groove while the other end of each plank is adapted to lap said nailing block and to be secured thereto.

5. In a railroad car provided with door openings, and doors slidably mounted on the car exterior, inner doors hingedly secured so as to extend into the door openings flush with the inner car walls and to swing inwardly into open position, parallel with the walls of the car, and means intermediate of the inner doors and the slidable doors for providing a grain seal.

6. In a railroad car provided with door openings, permanent door-posts at opposite sides of said openings and doors slidably mounted on the car exterior to move into abutting relation, an intermediate door-post carried by one of said doors, a spacing block secured to said intermediate door-post, an inner door hingedly secured at one side to swing into the door opening in lapping relation with a permanent door-post and with said spacing block, to extend flush with the inner car walls, and means for providing a grain seal for said inner door.

7. In a railroad car provided with door openings in the side walls thereof, permanent door-posts at opposite sides of said openings and doors slidably mounted on the car exterior to move into abutting relation, a vertically disposed channel secured to one of said doors, a door-post and a nailing block mounted in said channel and secured thereto so as to move with the door, a spacing block adjacent to said last mentioned door-post, an inner door hingedly secured so as to extend flush with the car inner side wall in lapping relation with a permanent door-post and said spacing block, and means whereby a grain-seal between the lower ends of the inner door and the slidably mounted door is provided.

8. In a railroad car, the combination of a main door and an auxiliary door mounted on the car exterior to slide into abutting relation, a movable door-post carried by the abutting end of the auxiliary door, a pair of vertical members disposed on opposite sides of said post, said members being of thickness less than the thickness of said door-post, said members being removably secured to said door-post, metallic reenforcing members secured to the abutting edges of both doors and adapted to form interengaging relation when the doors are closed, an inner door hingedly secured to the permanent door-post of the auxiliary door in lapping relation therewith and in lapping relation with one of said members secured to said movable door-post, and a sealing member adapted to be disposed intermediate of the lower ends of the inner door and the auxiliary door.

GORDON L. WHIPPLE
LEWIS K. SILLCOX.